Patented Dec. 29, 1942

2,306,610

UNITED STATES PATENT OFFICE 2,306,610

FRACTIONATION OF MIXTURES OF HYDROCARBONS

Richard Maling Barrer, Bingley, England

No Drawing. Application January 31, 1942, Serial No. 429,103. In Great Britain February 24, 1941

8 Claims. (Cl. 260—674)

This invention relates to a process for the fractionation of gas and/or vapour and/or liquid mixtures, hereinafter referred to for the sake of brevity as "gas and liquid mixtures."

The scientific and patent literature contains numerous references to the sorbing action of natural and artificial zeolites.

Of the hydrocarbons, methane and acetylene are sorbed by chabasite; ethylene is a border-line case (Schmidt, Z. Phys. Chem., 1928, 133, 265 and Sameshima, Bull. Chem. Soc. Japan, 1929, 4, 96). Sorption of pentane is negligible, according to Baba (Bull. Chem. Soc. Japan, 1930, 5, 190). Weigel and Steinhoff (Z. Krist., 1925, 61, 125) and Schmidt (Z. Phys. Chem., 1928, 133, 265) reported that butylene and butadiene are only slightly sorbed, and that propylene and ethane are border-line cases, showing a much smaller sorption than would be expected. Lamb (U. S. A. specification No. 1,813,174) made the statement that butane was much less sorbed than propane, and pentane than butane. Sameshima and Hemmi (Bull. Chem. Soc. Japan, 1934, 9, 27) state that analcite sorbs a small amount of acetylene. It was also reported that oils, and benzene, do not penetrate the zeolite lattice (e. g. Hey, Min. Mag., 1930, 22, 422). I have extensively investigated the laws governing the sorption or solution of long-chain hydrocarbons, and have found that, contrary to previous work, the straight chain hydrocarbons are copiously sorbed under appropriate conditions, the more energetically the greater the molecular weight, and I have investigated the capacity of certain other types of organic molecule, e. g., branched chain hydrocarbons and cyclic hydrocarbons, to form vagabond components of the zeolite lattice.

It is an object of the present invention to apply the results of this investigation to provide a process for the separation of straight chain hydrocarbons from branched chain and/or cyclic hydrocarbons, and it is a further object of the invention to bring about a quantitative separation.

Of the three classes of crystalline zeolites, fibrous, laminar and rigid three dimensional anionic networks I have found the last mentioned class only to be suitable for the separations of the present invention. Furthermore, the interstitial dimensions must be sufficiently large for the zeolite to sorb straight chain hydrocarbons but sufficiently small to exclude the branched chain and/or cyclic hydrocarbons.

With these objects in view the present invention provides a process for the separation of straight chain hydrocarbons from mixtures containing straight chain hydrocarbons and branched chain and/or cyclic hydrocarbons, wherein said mixtures are contacted with crystalline natural or synthetic zeolites having rigid three dimensional anionic networks and having interstitial dimensions sufficiently large to sorb straight chain hydrocarbons but sufficiently small to exclude the branched chain and/or cyclic hydrocarbons.

Preferably the zeolites are employed in excess, i. e., in a sufficient quantity to sorb the whole of the straight chain hydrocarbons.

The zeolites employed may be naturally occurring or synthetically prepared chabasite, phacolite, gmelinite, harmotome and the like, or suitable modifications of these produced by base exchange. I prefer to use natural or synthetic analcite in which some or all of the sodium is replaced by calcium, or natural or synthetic chabasite.

As an example analcite, $NaAlSi_2O_6 \cdot H_2O$, when dehydrated, has insufficiently large interstices or channels to admit any other than small polar molecules, (e. g., $NH_3$, and $H_2O$). When all or part of the sodium is replaced by calcium, giving $(Ca,Na_2) Al_2Si_4O_{12} \cdot 2H_2O$ the anhydrous mineral will now sorb straight chain hydrocarbons, as described, since the replacement of two $Na^+$ ions by one $Ca^{++}$ ion sufficiently increases the interstitial dimensions of the zeolite. In the case of chabasite the interstitial dimensions are already so large that exchange of $Ca^{++}$ by the larger $Ba^{++}$ ion or by two $Na^+$ ions does not prevent the chabasite from sorbing gases and vapours.

I believe that the essential requirement for sorption to occur is that the cross-section of the molecule at its widest point must be below a certain limiting area, characteristic of the pore size of the zeolite in question, before the molecule can enter the zeolite lattice. The length of the molecule and its molecular volume are of secondary importance only. In the case of a disc shaped molecule (cyclo-hexane, xylene, naphthalene, toluene and the like), the distance across the disc in its shortest dimension is the governing factor.

It would appear also that many molecules are of a cross-section which only just allows them to enter the channel, and that such molecules are then sorbed by a process of activated diffusion. Other molecules of smaller cross-section diffuse down the channels with extreme rapidity. Between molecules showing activated diffusion, and this second class of molecule there may be a very great difference in sorption velocity. Thus methane and ethane have the same cross-section which is small enough to permit them to diffuse extremely rapidly into the lattice of certain zeolites.

Propane, butane, pentane, hexane, heptane and higher n-hydrocarbons have greater cross-sections, because the molecules are zig-zag in shape owing to the carbon-carbon bond angle of 108°. The diffusion of these higher hydrocarbons into the zeolite lattice is then an activated diffusion and at room temperature occurs very much less rapidly than the diffusion of methane and ethane. Owing to this sudden great rate discontinuity an efficient separation of methane and ethane from higher hydrocarbons may be obtained.

When the hydrocarbons have side chains attached, the cross-section at the widest point is too great for sorption to occur. I have found that this is true of branched chain hydrocarbons such as isobutane, isopentane, iso-octane and the like under all conditions up to the limits of thermal stability of the hydrocarbons. I have further observed that certain cyclic hydrocarbons such as toluene, cyclohexane, benzene, xylene, cyclohexanone and naphthalene also fail to enter the zeolite lattice.

When the higher n-hydrocarbons are sorbed, I have observed that the velocity of sorption falls off slowly with increasing molecular weight. This apparently occurs because, although the cross-sections of the linear configurations of the molecule are the same, the actual length of the molecule exerts a secondary effect upon the velocity of diffusion within the crystal lattice. The velocity of diffusion rises exponentially with temperature, so that by appropriate choice of temperature the rate of sorption may be made suitably rapid. With propane, a convenient range is 100–200° C., and the higher the molecular weight the higher is the temperature for ready persorption. With n-heptane, for example, a suitable sorption rate was reached in the range 200–300° C. The velocity of sorption is increased by more finely subdividing the particles of sorbent, thereby also off-setting the smaller velocity due to increased molecular weight. It has further been observed that the quantity sorbed per unit time may be increased by increasing the pressure, again off-setting the effect of increased chain length.

Furthermore, the affinity of the n-hydrocarbons for certain zeolite lattices increases with increasing molecular weight. Thus at equilibrium, and with the zeolite say half saturated with hydrocarbon, the equilibrium pressure decreases in the order

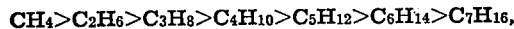
$CH_4 > C_2H_6 > C_3H_8 > C_4H_{10} > C_5H_{12} > C_6H_{14} > C_7H_{16}$, etc. Thus from a mixture of such hydrocarbons the components of higher molecular weight are at equilibrium selectively sorbed. If rates of sorption are compared, however, the velocities decrease in the order

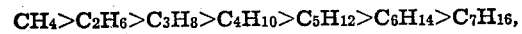
$CH_4 > C_2H_6 > C_3H_8 > C_4H_{10} > C_5H_{12} > C_6H_{14} > C_7H_{16}$, etc. so that initially, before equilibrium is reached, the low molecular weight components of a mixture are more rapidly removed.

I have further found that when a mixture consisting of n-aliphatic hydrocarbons and branched chain hydrocarbons is contacted with a moderate excess of zeolite at the appropriate temperature, the n-aliphatic hydrocarbons are quantitatively removed.

When a mixture of n-aliphatic hydrocarbons with cyclic hydrocarbons such as cycloparaffins, aromatic hydrocarbons and the like or hydrocarbons containing cycloparaffin or aromatic or cyclo-olefinic rings, is contacted with a moderate excess of zeolite at the appropriate temperature the n-aliphatic hydrocarbons are quantitatively removed.

These separations may be carried out with gas, vapour or liquid mixtures. If the zeolite is not present in sufficient quantity to sorb all the n-aliphatic hydrocarbons, or if insufficient time is allowed, the separation is partial.

The following examples illustrate how the process of the invention may be carried into effect:

1. A vapour mixture of isopentane and n-butane was treated. The total pressure of the vapour mixture was 14.9 cms., the vapour pressure of the isopentane was 6.6 cms., and that of the n-butane 8.3 cms. The mixture was contacted with 3.19 gms. of chabasite at 210° C. The pressure fell asymptotically to a limiting value and there was a decrease of pressure of 8.3 cms. The residue was found to be pure isopentane.

2. A vapour mixture of n-butane, toluene and cyclohexane was treated. The total pressure of the vapour mixture was 12.0 cms., the vapour pressure of the toluene being 2.0 cms., that of the cyclohexane 2.4 cms., and that of the n-butane 7.6 cms. The mixture was contacted with 3.19 gms. of chabasite at 216.5° C. The pressure fell asymptotically to a limiting value and there was a decrease in pressure of 7.6 cms. The residue was found to be a mixture containing only toluene and cyclohexane.

3. A liquid mixture containing 16.8% by volume of n-heptane and 83.2% by volume of toluene was heated with 6 gms. of chabasite at 205° C. for 7 hours in a small sealed tube. Analysis showed that the residual liquid which was not sorbed by the zeolite contained 2.87% by volume of n-heptane and 97.13% by volume of toluene.

It will be understood that the straight chain hydrocarbons sorbed by the zeolites may be removed therefrom in any of the customary manners, for example by steaming.

The following separations were effected in a similar manner:

Propane from isopentane;
Propane from isobutane;
n-Butane from isopentane;
n-Butane from isobutane;
n-Heptane from iso-octane;
n-Butane and propane from isobutane.

By the term "interstitial dimensions" as used herein I mean the narrowest dimension of the interstitial channels.

It will be understood that the term "zeolite" as used in the appended claims includes synthetic as well as natural zeolites.

I claim:

1. In a process for the separation of straight chain hydrocarbons from mixtures containing straight chain hydrocarbons and at least one substance selected from the group consisting of branched chain hydrocarbons and cyclic hydrocarbons the step of contacting said mixtures with crystalline zeolites having rigid three dimensional anionic networks and having interstitial dimensions sufficiently large to sorb the straight chain hydrocarbons but sufficiently small to exclude the other hydrocarbons.

2. In a process for the separation of straight chain hydrocarbons from mixtures containing straight chain hydrocarbons and at least one substance selected from the group consisting of branched chain hydrocarbons and cyclic hydrocarbons the step of contacting said mixtures with chabasite.

3. In a process for the separation of straight chain hydrocarbons from mixtures containing straight chain hydrocarbons and at least one substance selected from the group consisting of branched chain hydrocarbons and cyclic hydrocarbons the step of contacting said mixtures with analcite in which at least part of the sodium atoms have been replaced by calcium atoms.

4. In a process for the separation of straight chain hydrocarbons from mixtures containing straight chain hydrocarbons and at least one substance selected from the group consisting of branched chain hydrocarbons and cyclic hydrocarbons the step of contacting said mixtures with crystalline zeolites having rigid three dimensional anionic networks and having interstitial dimensions sufficiently large to sorb the straight chain hydrocarbons but sufficiently small to exclude the other hydrocarbons, the said zeolites being employed in a sufficient quantity to sorb the whole of the straight chain hydrocarbons.

5. In a process for the separation of n-butane and isopentane from a mixture containing the same the step of contacting said mixture with chabasite, the chabasite being employed in sufficient quantity to sorb the whole of the n-butane.

6. In a process for the separation of n-butane from a mixture containing $n$-butane, toluene and cyclohexane, the step of contacting said mixture with chabasite, the chabasite being employed in sufficient quantity to sorb the whole of the n-butane.

7. In a process for the separation of toluene and n-heptane from a mixture containing the same the step of contacting said mixture with chabasite, the chabasite being employed in sufficient quantity to sorb the whole of the n-heptane.

8. A process for the separation of straight chain hydrocarbons from mixtures containing straight chain hydrocarbons and at least one substance selected from the group consisting of branched chain hydrocarbons and cyclic hydrocarbons which comprises contacting said mixtures with chabasite, the chabasite being employed in sufficient quantity to sorb the whole of the straight chain hydrocarbons and recovering the straight chain hydrocarbons from the zeolites.

RICHARD MALING BARRER.